Patented July 25, 1950

2,516,233

UNITED STATES PATENT OFFICE 2,516,233

ALTERNATE OXIDATION AND REDUCTION OF CARBON

Art C. McKinnis, Long Beach, Calif., assignor to Union Oil Company of California, Los Angeles, Calif., a corporation of California No Drawing. Application February 17, 1947, Serial No. 729,193

18 Claims. (Cl. 252—421)

This invention relates to a method for the preparation of highly activated carbons from carbonaceous materials and more particularly applies to a method for primarily increasing the adsorptive selectivity and secondarily increasing the adsorptive capacity thereof.

The term "adsorptive selectivity" as used herein is meant to indicate the property exhibited by adsorbents such as activated carbons whereby certain constituents present in the medium surrounding the adsorbent, whether it be liquid or gaseous, are preferentially adsorbed on the adsorbent to a greater degree than certain other constituents present in the medium. The adsorptive selectivity of the activated carbons described herein is measured by the ratio of the quantity of isobutylene adsorbed to the quantity of propane adsorbed on a given quantity of activated carbon.

The term "adsorptive capacity" as used herein is meant to indicate the quantity of a given material which may be adsorbed on a given adsorbent under specified conditions of concentration, pressure, and temperature. The adsorptive capacity of these activated carbons is, in general, best indicated by the quantity of isobutylene adsorbed per unit weight of activated carbon.

Activated carbons which exhibit adsorptive properties have for some time had many wide military and industrial uses and may be prepared under proper conditions of operation from virtually any animal, vegetable or mineral carbon-containing material. The literature pertaining to the preparation and use of activated carbons shows that these may be prepared from such animal matter as bones, blood, and flesh as produced as waste material from meat packing houses. This type of activated carbon which is commonly termed "animal charcoal" and especially that prepared from bones which is commonly referred to as "bone char," is widely used in the refining of sugar in which operation it functions to decolorize sugar stocks by the adsorption of the color bodies contained therein. Activated carbons may be prepared from an extremely wide variety of vegetable matter including woods such as pine, birch, log wood, quebracho, hemlock, cedar, and other woods particularly in waste from such as shavings, sawdust, and the like; from waste agricultural products including corn husks, corncob, corn stalks, cane trash, bagasse, rice hulls, coffee, cocoa, maté, molasses, alcohol slop, and waste liquors and extracts from paper manufacture, and the like; from the hulls and shells of various nuts such as cocoanut hulls, peach nut shells, walnut and other nut shells; from fruit pits such as those of the apricot and peach; and a variety of other vegetable matter including spent olive pulp, surgical cotton, flax waste, moss, hydrogenated oil residue, rubber waste, extracted cotton hulls and many other materials. Virtually any vegetable substances may be destructively distilled under proper conditions to produce an activated carbon possessing properties of adsorption. Activated carbons may likewise be prepared from a variety of mineral and near-mineral sources, such materials as peat, lignite, sub-bituminous, bituminous, and anthracite coals, as well as such materials as flue ashes, and the like. The method of my invention as hereinafter more fully described, applies to all activated carbons regardless of their source or mode of preparation, and may be used to advantage in effectively increasing the adsorptive selectivity and the adsorptive capacity of such activated carbons.

The carbonization of carbonaceous materials such as those cited above, particularly those materials more commonly used in the preparation of activated carbons which include the various woods and nut shells and hulls, must be carried out under carefully controlled conditions of temperature in order to produce a satisfactory activated carbon. The preliminary carbonization, during which the water and compounds of hydrogen and carbon together with compounds of hydrogen, oxygen and carbon present in the carbonaceous material are removed, is carried out at a temperature below about 500° C. to 600° C. leaving a carbon residue of a particular nature and which may be activated by various chemical and/or physical treatments to produce an activated carbon. The preliminary carbonization reactions are preferably performed at a temperature below those stated in order to minimize the formation of a so-called high temperature carbon which contains certain amounts of graphite and is in general incapable of complete and effective activation. The graphitic or high temperature type of carbon is relatively resistant to oxidation and is generally formed at temperatures above about 600° C. as in the cracking of hydrocarbons although other heating and carbonization conditions effect its formation.

The activation of carbons produced at low temperatures such as between about 300° C. and 500° C. from materials cited by chemical or thermal decomposition are capable of activation to produce an activated carbon possessing adsorbent properties. The activation period is generally considered to include an oxidation or partial oxidation treatment whereby hydrocarbon-like materials associated with the carbon to be activated are removed at elevated temperatures of between about 800° C. and 1200° C. In general this partial oxidation is performed using steam or carbon dioxide or mixtures thereof as the oxidizing medium. During this oxidizing period from 10% to 60% by weight of the original material present is removed leaving a residue of activated carbon which displays properties of adsorption. The most highly adsorbent carbons have been prepared from the various fruit pits and nut hulls according to the previous description. The activated carbon prepared from cocoanut hulls under proper conditions appears to have perhaps the highest adsorptive capacity when applied to the adsorption of gases and some types are capable of adsorbing in excess of 40% of their own weight of a gas. Such activated carbons also display properties of preferential adsorption for those gaseous constituents in a given mixture having the higher molecular weight or the higher critical temperatures, and it is upon these preferential adsorption properties that the selective adsorption process of gas fractionation is based.

It is an object of my invention as hereinafter more fully described to provide a method for the preparation of highly activated carbons.

It is a further object of my invention to provide a method for the preparation of activated carbons which have higher adsorptive selectivities than those previously prepared by the conventional methods.

It is a further object of my invention to increase the adsorptive capacity of an activated carbon prepared by the conventional methods.

It is a still further object of my invention to provide a method for the preparation of activated carbons which have increased adsorptive capacities and increased adsorptive selectivities which facilitates the separation of gaseous mixtures by the selective adsorption process and which also permits the separation of gaseous mixtures previously considered inseparable by selective adsorption.

A further object of my invention is to provide a method for improving activated carbons with a minimum weight loss of carbon during the process.

Other objects and advantages of my invention will become apparent to those skilled in the art as the description thereof proceeds.

Carbons with a high value of adsorptive selectivity are the most desirable as adsorbents both in liquid decolorizing and gas adsorption and fractionation applications.

By the method of my invention, as more fully described hereinafter, it is possible to materially increase the adsorptive selectivity and simultaneously increase the adsorptive capacity of an activated carbon above that attained by the conventional steam or steam-carbon dioxide activation process. Whereas, during the conventional activation of carbonaceous materials to form an activated carbon, considerable carbon loss is brought about by reaction with water and carbon dioxide according to the following equations:

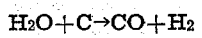
and
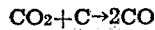

during the extended period of high temperature activation, the method according to my invention prescribes periods of very short oxidation during which relatively small amounts of carbon are lost. Through the use of active oxidizing agents and short periods of treatment the wasteful loss of carbon in the conventional activation process may be substantially reduced. In addition, by the method of my invention, a much greater increase in adsorptive selectivity and adsorptive capacity is effected per unit weight loss of carbon than by the conventional activation process.

Briefly, the above-mentioned objects may be accomplished by subjecting an activatable carbon, i. e., a carbon prepared by low temperature carbonization as previously described and which has substantially none of the properties exhibited by graphite, graphitic carbons, or other carbons prepared by high temperature carbonization, to a plurality of successive alternate treatments of low temperature oxidation between about 50° C. and 200° C., with a highly active oxidizing agent and elevated temperature reductions between about 600° C. and 1100° C. with a selected reducing agent. By employing an oxidizing agent of high activity for a short duration of time, such as less than about 0.05 to 15 minutes, it is possible to markedly reduce carbon loss while effectively increasing the adsorptive selectivity and the adsorptive capacity of the activated carbon. The following reduction which is carried out at elevated temperatures effects a further increase in the adsorptive selectivity and the adsorptive capacity and a simultaneous removal from the surface of the activated carbon reaction products formed and deposited there during the previous oxidation. The removal of such reaction products by high temperature reduction serves not only to increase the selectivity and the capacity of the adsorbent as previously described, but also places the adsorbent in a condition in which it is more efficiently acted upon by the succeeding low temperature oxidation. The continued treatment of the carbon by the oxidizing agent results in little improvement after a short initial period of treatment and therefore short periods of oxidation are preferred such as from about 0.5 to 5 minutes. The following period of reduction at an elevated temperature may be continued for considerably longer periods to advantage, such as from about 2 to 50 minutes, although after a time the rate of improvement in the adsorbent decreases. Consequently, the preferred periods of oxidation are between about 0.5 and 5 minutes duration and are followed by somewhat longer periods of reduction such as from about 2 to 15 minutes in order to effect the most efficient improvement of a given carbon or activated carbon. A carbon may be subjected to a plurality of as many as 12 to 15 or more successive oxidations and in alternation with as many reductions in order to improve the carbon and to impart to it values of adsorptive selectivity which are considerably greater than those of conventional activated carbons.

It is generally believed that the nature of the surface of the activated carbon determines the adsorptive capacity and the adsorptive selectivity thereof and that the size distribution of the pore or capillary spaces in particular govern the adsorptive selectivity. It may be assumed that the smaller pore spaces are available for the adsorption therein of materials of low molecular weight and small molecular dimensions, thereby excluding from such small pore spaces the higher molecular weight materials having larger molecular dimensions. If, for example, an activated carbon was known to contain only such small pore spaces, it would in all probability exhibit a fairly large degree of adsorption for the low molecular weight materials and show only a limited adsorption for the higher molecular weight materials. Conversely, an activated carbon which has pore spaces sufficiently large to accommodate the large higher molecular weight molecules would probably display adsorptive properties for both the high and low molecular weight molecules, with probably a preferential adsorption for the former molecules. Thus, it is obvious that were it possible to alter the distributional relationship of the sizes of the pore or capillary spaces present in the structure of the adsorbent carbon, it would be possible to effectively alter the adsorption characteristics of the carbon and in particular it would be possible to modify the adsorptive selectivity. It is therefore believed that the overall changes in the adsorptive selectivity of activated carbons subjected to the process of my invention, is due principally to such changes in the size distribution of the pore or capillary spaces in the adsorbent.

Oxidizing agents which are applicable to the treatment of carbons according to my invention include the oxygen-containing mineral acids such as nitric acid, metaphosphoric acid, orthophosphoric acid and other acids of phosphorus possessing oxidizing properties, sulfuric acid, sulphurous acid and other oxygenated acids of sulfur which possess oxidizing properties, dilute solutions of perchloric acid under special conditions of control, and the acid anhydrides such as the equilibrium mixture

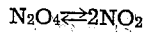
$$N_2O_4 \rightleftharpoons 2NO_2$$

diluted with nitrogen or other inert gaseous material, nitric oxide, sulfur trioxide, sulfur dioxide, and other oxygen containing acid anhydrides which are normally gaseous and which exhibit oxidizing properties, such gases as chlorine, chlorine dioxide, and the like, together with those compounds of the above-mentioned acids, anhydrides, which are either added as such or derivable from materials present under conditions of oxidation according to the method of my invention. Reducing agents suitable for the reduction portion of the method of activation according to my invention include hydrogen, ammonia, water, and mixtures of nitrogen and water vapor, and others.

Although the cited oxidizing and reducing agents are applicable to the successively oxidation and reduction steps in the carbon activation process according to my invention, I prefer to employ concentrated nitric acid as the oxidizing agent and hydrogen as the reducing agent, although ammonia and the mixture of nitrogen and water vapor perform almost equally as well as reducing agents. The nitric acid preferred is that having a concentration of about 70 weight per cent in an aqueous solution, although nitric acid of as low as 35 weight per cent and as high as 100 weight per cent or even fuming nitric acids are effective in bringing about the desired oxidation. Organic oxidizing agents such as nitroethylnitrite formed by the reaction of ethylene with concentrated nitric acid may be used. This is an example of those oxidizing agents which at the conditions of oxidation release nitric acid or oxides of nitrogen which are the active oxidizing agents.

In performing the preferred modification of my invention using a plurality of successive alternate oxidations and reductions of the carbon to be treated with concentrated nitric acid and either hydrogen, ammonia, or mixtures of nitrogen and water vapor, respectively, I prefer to use nitric acid of from 50 to 90 weight per cent and particularly nitric acid of about 70 weight per cent concentration at its boiling temperature of about 120° C. substantially at atmospheric pressure in the oxidizing step, and hydrogen at substantially atmospheric pressure passing over the carbon at an elevated temperature of between about 700° C. and 1000° C., preferably at a temperature of about 850° C. as the reducing step.

A carbon may be impregnated with a basically reacting compound, such as sodium hydroxide, potassium oxide and other alkali metal oxides and hydroxides to act as a catalyst for a high temperature ammonia reduction. When ammonia contacts such an impregnated carbon at a temperature of between about 600° C. and 1100° C., the following reaction takes place:

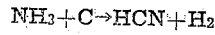
$$NH_3 + C \rightarrow HCN + H_2$$

The presence of the alkaline compounds catalyzes the reaction by reacting with the hydrocyanic acid liberated. The liberated hydrogen also acts in a reducing capacity at these temperatures.

The following examples will serve to illustrate more clearly the method of my invention as applied both to the activation of carbon and to the increase in the adsorptive selectivity and the adsorptive capacity of activated carbons. The quantities of carbon, acid, propane, isobutylene, water, etc., given in the following examples are parts by weight. The adsorption data are those determined from adsorptions performed at 25° C. and at one atmosphere pressure.

*Example I*

87 parts of dry activated carbon prepared from cocoanut shells, and having at 25° C. and one atmosphere pressure a propane adsorption of 0.241 parts of propane per part of carbon and 0.335 parts of isobutylene per part of carbon giving an adsorptive selectivity ratio of 1.39, was boiled with 710 parts of 70 weight per cent nitric acid for 60 seconds at about 120° C. The treated carbon was then washed with 1000 parts of boiling water to remove any residual nitric acid. After washing, the charcoal was heated to a temperature of about 850° C. in contact with a stream of hydrogen for a period of 5 minutes completing the first oxidation and reduction cycle. Subsequently, the oxidation and reduction cycle was repeated four more times giving, at the end of 5 complete cycles, 60 parts of dry treated carbon. The propane adsorption of the treated carbon was 0.208 part of propane per part of treated carbon and the isobutylene adsorption was 0.354 part of isobutylene per part of treated carbon giving an adsorption selectivity ratio of 1.71. This amounts to an increase in selectivity ratio of 0.32 over that of the untreated activated carbon. The oxidation and reduction cycle was repeated five more times and at the end of a total of 10 complete cycles 52 parts of dry treated carbon was obtained having a propane adsorption of 0.181 part of propane per part of carbon and an isobutylene adsorption of 0.364 part of isobutylene per part of carbon giving an adsorptive selectivity ratio of 2.01. This indicates that the treatment substantially increases the preferential adsorption exhibited by the untreated activated char and simultaneously increases to a certain extent the total over-all adsorption of the carbon.

Example II 64.5 parts of activated carbon having the same properties as the untreated activated carbon indicated in Example I was boiled with 535 parts of 70 weight per cent nitric acid for a period of 8 minutes at about 120° C. The resulting treated carbon was washed with 750 parts of boiling water and dried giving 54.5 parts of dry carbon. The treated carbon thus obtained had a propane adsorption of 0.207 part of propane per part of carbon and an isobutylene adsorption of 0.323 part of isobutylene per part of carbon giving an adsorptive selectivity ratio of 1.51 as compared with an adsorptive selectivity ratio of 1.39 for the untreated carbon. The dry treated carbon thus obtained was heated to a temperature of about 850° C. and contacted at that temperature with a stream of nitrogen saturated with water at room temperature, a gaseous mixture therefore having a composition of 96% nitrogen and 4% water vapor. The reduced carbon was cooled to room temperature and boiled again with the same quantity of concentrated nitric acid previously used for a period of 10 minutes. The oxidized carbon was again washed with boiling water in order to remove residual nitric acid and after drying gave 48.7 parts of dry treated carbon. The propane adsorption of this carbon was 0.177 part of propane per part of carbon and an isobutylene adsorption of 0.293 part of isobutylene per part of carbon giving an adsorption selectivity ratio of 1.65. The treated carbon was subsequently heated to a temperature of about 850° C. and contacted with a stream of nitrogen saturated with water, having a composition the same as that given above, for a period of 15 minutes. The resulting product after washing with hot water and drying, consisted of 41.3 parts of carbon and had a propane adsorption of 0.186 part of propane per part of carbon and an isobutylene adsorption of 0.323 part of isobutylene per part of carbon giving an adsorptive selectivity ratio of 1.74. Subsequently 2 more cycles of oxidation and reduction were performed on the carbon obtained, the oxidation step having a duration of one minute and the reduction step with nitrogen saturated with water having a duration of five minutes. The product, washed free of residual acid and dried consisted of 30.1 parts of treated carbon and had a propane adsorption of 0.193 part of propane per part of carbon and an isobutylene adsorption of 0.349 part of isobutylene per part of carbon giving an adsorptive selectivity ratio of 1.81.

In this example long periods of oxidation have been used, in the first cycle extending over a period of 8 minutes, and in the second cycle extending over a period of 10 minutes, and the relatively high rate of carbon loss is shown. Thus, for a series of 4 complete cycles the weight loss amounted to over 50% of the weight of the original carbon and gave a carbon having a lower adsorptive selectivity ratio than the carbon in Example I wherein the carbon was subjected to a total of 10 cycles and in which the carbon loss was only 40%. On comparison of Examples I and II, the advantages of short periods of oxidation are shown as well as the fact that the treatment primarily increases the adsorptive selectivity ratio rather than the adsorptive capacity of the carbon.

Example III

In order to show the improvement which it is possible to obtain by treating an unactivated carbon according to the method of my invention, 73 parts of dry cocoanut shells were carbonized at a temperature of 550° C. in an atmosphere of nitrogen and subsequently heated to 850° C. for a period of 12 minutes in an atmosphere of ammonia. The resulting carbon had a propane adsorption of 0.110 part of propane per part of carbon and an isobutylene adsorption of 0.134 part of isobutylene per part of carbon giving an adsorptive selectivity ratio of 1.22 which is somewhat less than that of the activated carbon used in Examples I and II. The treated carbon thus obtained was subjected to a one minute oxidation with 70 weight per cent nitric acid at about 120° C., washed, dried, and heated to about 850° C. and contacted with a stream of ammonia. 58 parts of treated carbon were obtained which had a propane adsorption of 0.156 part of propane per part of carbon and an isobutylene adsorption of 0.215 part of isobutylene per part of carbon for an adsorptive activity ratio of 1.38 which is substantially the same as that of the untreated activated carbon used in Examples I and II. In this case a period of somewhat less than about 25 minutes was required to activate the carbon to an adsorptive selectivity value substantially equal to that of untreated activated carbons which are steam activated for a considerably longer time. In addition, the yield of active carbon based upon the weight of dry cocoanut shell is about 80%. By repeating the nitric acid oxidation and ammonia reduction cycles five more times for a total of six complete cycles, 37 parts of treated carbon are obtained which carbon has a propane adsorption of 0.274 part of propane per part of carbon and an isobutylene adsorption of 0.48 part of isobutylene per part of carbon giving an adsorptive selectivity ratio of 1.75. On comparison with the treated carbon obtained by the procedures in Example I it will be noted that at the end of five complete cycles the carbon in Example I had an adsorptive selectivity ratio of 1.71 compared to the 1.75 value obtained by the alternate nitric acid-ammonia oxidation-reduction procedure of this example, but that the adsorptive capacity for isobutylene is much greater, 0.48, in the present example compared to 0.354 part in Example I at the end of five cycles. This indicates the beneficial effect, on the carbonized material initially formed, of a reduction in the presence of ammonia followed by nitric acid oxidation.

Example IV 68.1 parts of activated carbon having properties of adsorption similar to those of the carbon in Example I, was saturated with ethylene which was subsequently treated at a temperature of about 100° C. with 30 parts of 80 weight per cent nitric acid, the calculated amount required to convert the adsorbed ethylene to nitroethylnitrite. The carbon thus obtained which had a dry appearance, was heated at a temperature of 150° C. for a period of one minute. Subsequently the treated carbon was heated to 850° C. and contacted with a stream of ammonia for a period of three minutes. The product obtained was 62.7 parts of treated carbon having a propane adsorption of 0.261 part of propane per part of carbon and an isobutylene adsorption of 0.372 part of isobutylene per part of carbon giving an adsorptive selectivity ratio of 1.43. The ethylene saturation step was repeated with the subsequent contacting with 80% nitric acid as described above and 55.9 parts of treated carbon were obtained, which carbon had a propane adsorption of 0.261 part of propane per part of carbon and an isobutylene adsorption of 0.396 part of isobutylene per part of carbon giving an adsorptive selectivity ratio of 1.52. On repetition of the above-described cycle twice again, the propane adsorption remained substantially constant while the isobutylene adsorption rose to a value of 0.425 giving an adsorptive selectivity ratio of 1.622. At the temperature of oxidation, the nitroethylnitrite decomposes forming nitrogen oxides which are active oxidizing agents.

*Example V*

40.9 parts of activated carbon, like that of Example I, was treated with about 50 parts of orthophosphoric acid at a temperature of 475° C. for a period of five minutes. The treated carbon was subsequently cooled, washed with mineral-free water, and heated to 850° C. for a period of ten minutes in contact with the stream of hydrogen. 38.8 parts of treated carbon were obtained having a propane adsorption of 0.235 part of propane per part of carbon and an isobutylene adsorption of 0.341 part of isobutylene per part of carbon giving an adsorptive selectivity ratio of 1.45 compared with an adsorptive selectivity ratio of 1.39 of the original carbon.

*Example VI*

90 parts of activated carbon having an adsorptive selectivity ratio of 1.39 was impregnated with 9 parts of sodium hydroxide in aqueous solution and the impregnated carbon thus formed was dried and heated to a temperature of from 600° C. to 900° C. and contacted with a stream of ammonia. The rate of the reaction $$NH_3 + C \rightarrow HCN + H_2$$

was found to be increased approximately tenfold by the presence of the alkaline catalyst over the rate of reaction in the same temperature range between ammonia and an impregnated carbon. 83 parts of carbon were obtained following the ammonia reduction which had an adsorptivity ratio of 1.67, and a propane adsorption of 0.212 part per part of carbon and an isobutylene adsorption of 0.355 part per part of carbon.

*Example VII*

55 parts of activated carbon having an adsorptive selectivity ratio of 1.39, as given in Example I, was treated for a period of one minute with 450 parts of 70 weight per cent nitric acid at a temperature of 122° C. The resulting carbon was cooled, washed, dried, and heated to a temperature of 850° C. and contacted for a period of five minutes with a stream of ammonia. The carbon was then cooled and retreated with nitric acid as before. On the completion of ten complete cycles of oxidation and reduction, 34 parts of a treated carbon was obtained, which carbon had a propane adsorption of 0.220 part of propane per part of carbon and an isobutylene adsorption of 0.450 part of isobutylene per part of carbon giving an adsorptive selectivity ratio of 2.05.

The heat stability of the treated carbons which are prepared according to the processes described herein and included within the scope of my invention is shown in the following table wherein the adsorption characteristics of a nitric acid treated carbon are tabulated. This carbon was stripped of adsorbed gases at a temperature of about 800° C., cooled, and then analyzed to determine both the adsorptive capacity and the adsorptive selectivity of the carbon.

|  | Propane Adsorption | Isobutylene Adsorption | Adsorptive Selectivity Ratio |
|---|---|---|---|
| Treated Carbon | 0.196 | 0.310 | 1.58 |
| Stripped Once | 0.197 | 0.313 | 1.59 |
| Stripped Twice | 0.199 | 0.318 | 1.59 |

The adsorptive capacity, as shown by the propane and isobutylene adsorption changes negligibly with succeeding stripping treatment performed in order to remove adsorbed gases. Likewise it is shown that the adsorptive selectivity does not change and may be considered to be constant.

It is obvious from the foregoing description of the embodiments of my invention and the examples thereof that I have provided a method for the improvement of activated carbons whereby the adsorptive selectivity principally as well as the adsorptive capacity may be substantially increased to form an activated carbon which is much more active and will perform more efficiently in processes involving activated carbon adsorption. In the selective adsorption process of gas fractionation, the employment of special carbons prepared according to the methods disclosed herein permit the more efficient separation of gaseous mixtures normally separated by the selective adsorption process, permits the utilization of a smaller amount of activated carbon per unit volume of gaseous mixture to be separated, and also permits the separation of gaseous mixtures containing constituents which are difficult to separate by the selective adsorption process in which conventional types of activated carbon are employed.

Having described and illustrated the principle of my invention and realizing that many modifications thereof may occur to those skilled in the art without departing from the spirit and scope of my invention and of the following claims.

I claim:

1. A method for the improvement of activated carbon which comprises subjecting said activated carbon to a plurality of successive alternate oxidations and reductions, said oxidations comprising contacting said activated carbon with an acidic oxidizing agent at a temperature between about 50° C. and about 200° C. for a period of between about 0.05 and about 15 minutes; and said reductions comprising contacting said activated carbon with a reducing agent at a temperature between about 600° C. and about 1100° C. for a period of between about 2 and about 50 minutes.

2. A method according to claim 1 wherein said acidic oxidizing agent comprises at least one oxidizing agent selected from the class of acidic oxidizing agents consisting of nitric acid, metaphosphoric acid, orthophosphoric acid, sulfuric acid, sulfurous acid, perchloric acid, nitrogen dioxide and its equilibrium dimer nitrogen tetroxide, nitric oxide, sulfur trioxide, sulfur dioxide, chlorine, and chlorine dioxide; said acidic oxidizing agent being added as such or derivable from materials present under the conditions of oxidation.

3. A method according to claim 1 wherein said reducing agent comprises at least one reducing agent selected from the class of hydrogen-containing reducing agents consisting of hydrogen, ammonia, and water vapor.

4. A method according to claim 1 wherein said acidic oxidizing agent comprises an oxygen-containing mineral acid.

5. A method according to claim 1 wherein said reducing agent comprises hydrogen.

6. A method according to claim 1 wherein said reducing agent comprises ammonia.

7. A method according to claim 1 wherein said reducing agent comprises water vapor.

8. A method according to claim 2 wherein said acidic oxidizing agent is nitrogen dioxide derived by impregnating the carbon with nitroethylnitrite followed by heating of the carbon to effect the oxidation step.

9. A method of treating adsorbent charcoal which comprises contacting said charcoal with an oxygen-containing mineral acid at a temperature between about 50° C. and 200° C. for periods of time ranging from 0.05 minute to about 15 minutes, subsequently contacting the oxidized charcoal thus formed with a reducing agent in the vapor phase at a temperature above about 600° C. for a period of time ranging from about 2 minutes to about 50 minutes, and subsequently retreating the reduced charcoal thus formed with a series of oxidations and reductions as described.

10. A method for the improvement of activated carbon by increasing the adsorptive selectivity and the adsorptive capacity thereof which comprises subjecting said activated carbon to a plurality of oxidizing treatments with nitric acid at a temperature between about 50° C. and about 200° C. for a period of from about 0.05 to about 15 minutes in alternation with a series of reducing treatments with $H_2$ at a temperature between about 600° C. and about 200° C. for the period of from about 2 to about 50 minutes.

11. A method according to claim 10 wherein said nitric acid is of a strength between about 35 weight per cent and about 100 weight per cent.

12. A method according to claim 10 wherein said nitric acid comprises fuming nitric acid.

13. A method for the improvement of activated carbon by increasing the adsorptive selectivity and the adsorptive capacity thereof which comprises subjecting said activated carbon to a plurality of oxidizing treatments with nitric acid having a concentration of from about 50 weight per cent to about 90 weight per cent, said oxidizing treatment being performed at a temperature of about 50° C. to about 200° C. for a period of from about 0.5 to 5 minutes, said oxidizing treatments also being performed in alternation with a plurality of reducing treatments with hydrogen, said reducing treatments being performed at a temperature between about 700° C. and about 1000° C. for a period of from about 2 to about 15 minutes.

14. A method for improving the absorbent properties of activated charcoal which comprises boiling charcoal with nitric acid having a concentration of between about 50% and 90% for from between about 0.5 minute to 15 minutes to form an oxidized charcoal, washing traces of residual nitric acid from said oxidized charcoal, heating the oxidized charcoal to a temperature between about 600° C. and 1100° C., and contacting the thus heated charcoal with hydrogen for a period of from about 2 minutes to about 15 minutes to form an improved charcoal.

15. A method for the improvement of activated carbon by increasing the adsorptive selectivity and the adsorptive capacity thereof which comprises subjecting said activated carbon to a plurality of oxidizing treatments with nitric acid at a temperature between about 50° C. and 200° C. for a period of from about 0.05 to about 15 minutes in alternation with a plurality of reducing treatments with ammonia at a temperature between about 600° C. and about 1100° C. for a period of from about 2 minutes to about 50 minutes.

16. A method for the improvement of activated carbon by increasing the adsorptive selectivity and the adsorptive capacity thereof which comprises subjecting said activated carbon to a plurality of oxidizing treatments with nitric acid at a temperature between about 50° C. and about 200° C. for a period of from about 0.05 to about 15 minutes in alternation with a plurality of reducing treatments with a gas containing steam at a temperature of between about 600° C. and about 1100° C. for a period of from about 2 minutes to about 50 minutes.

17. A method for the improvement of activated carbon by increasing adsorptive selectivity and the adsorptive capacity thereof which comprises subjecting said activated carbon to a plurality of oxidizing treatments with nitric acid having a concentration of from about 70 weight per cent, said oxidizing treatment being performed at a temperature of about 120° C. for a period of from about 0.5 to 5 minutes, said oxidizing treatments also being performed in alternation with a plurality of reducing treatments with a gas containing steam, said reducing treatments being performed at a temperature of about 850° C. for a period between about 2 and 15 minutes.

18. A method for producing an activated carbon which comprises carbonizing a carbonaceous material to form an activatable carbon, subjecting said activatable carbon to a plurality of successive alternate oxidations and reductions, said oxidations comprising contacting said activated carbon with an acidic oxidizing agent at a temperature between about 50° C. and about 200° C. for a period of between about 0.05 and about 15 minutes, and said reductions comprising contacting said activated carbon with a reducing agent at a temperature between about 600° C. and about 1100° C. for a period of between about 2 and about 50 minutes to form said activated carbon.

ART C. McKINNIS.

REFERENCES CITED

The following references are of record in the file of this patent:

UNITED STATES PATENTS

| Number | Name | Date |
|---|---|---|
| 1,487,985 | Morrell | Dec. 25, 1923 |
| 1,813,341 | Cunningham | July 7, 1931 |
| 2,201,050 | Oberle | May 14, 1940 |
| 2,420,810 | Bray et al. | May 20, 1947 |

FOREIGN PATENTS

| Number | Country | Date |
|---|---|---|
| 292,798 | Great Britain | June 28, 1928 |